July 16, 1968  C. L. KINGSBAKER, JR., ET AL  3,392,455
VARIABLE PRESSURE SOLVENT STRIPPING SYSTEM
Filed Nov. 16, 1965  2 Sheets-Sheet 1

Fig. 1

INVENTORS.
Clyde L. Kingsbaker, Jr.
Robert D. Good
Kenneth W. Becker
BY James W Dodd
THEIR ATTORNEY _United States Patent Office_  3,392,455
Patented July 16, 1968

3,392,455
VARIABLE PRESSURE SOLVENT
STRIPPING SYSTEM
Clyde L. Kingsbaker, Jr., Robert D. Good, and Kenneth W. Becker, Pittsburgh, Pa., assignors to Blaw-Knox Company, Pittsburgh, Pa., a corporation of Delaware
Filed Nov. 16, 1965, Ser. No. 508,084
16 Claims. (Cl. 34—36)

ABSTRACT OF THE DISCLOSURE

This invention relates to a process and apparatus for removing residual volatile substance from a particulate solid material and heat treating said solid material, wherein the material is contacted with vapors of a volatile substance. A determination is made of the maximum temperature that the material to be treated should be subjected to during the processing of the material, the material is placed in a pressure tight chamber, and the temperature of that chamber is held below the said critical temperature by controlling the pressure while varying the time of treatment during which the material is in the chamber until the solvent is completely removed.

---

This invention relates to apparatus and process for the treatment of materials and more particularly to process and apparatus for heat treating organic materials so as to control water soluble proteins therein and the removal of a volatile liquid from the solid organic particles impregnated therewith.

In the treatment of organic vegetable materials for use as animal or human food it is desirable to produce a material wherein the degree of denaturization of the proteins is controlled in accordance with certain predetermined rules depending on the use to which the material is to be put.

In the extraction of oils from vegetable seeds such as soybeans, a solvent is employed as a vehicle for removing the oil from the seeds. After oil extraction there remains a residue of solvent entrained in the seeds and it is desirable to remove such residue if the seeds or the products to be made therefrom are to be acceptable as a food product. The commercial solvents used in oil extraction often have an offensive odor, and even when only slight traces of solvent remain in material so treated, an irritating odor may emanate therefrom that will interfere with the material's usefulness. Particularly when human food is to be produced from the material, it is frequently desirable to erase all evidence of the solvent utilized in the oil extraction process while keeping substantially all of the proteins therein in the water soluble condition.

There is therefore a distinction between the terms desolventizer and deodorizer; desolventizer apparatus removes most of the pre-absorbed or entrained solvent from the material, and the deodorizer apparatus acts to leave the material free of solvent vestiges which would not normally be detected except as an elusive pungent smell.

In a desolventizing-deodorizing process, it is also frequently desirable to heat-treat the material under very carefully controlled conditions. For some purposes very little cooking or heat-treating may be desired, while for other purposes extensive heat-treating at relatively high temperatures may be required to produce a well cooked product. The method of the present invention is partially the result of a successful effort to find a system which will process various materials previously subjected to a wide variety of treatments and, thus, presenting diverse respective characteristics. This invention is also the result of an intention to develop a system capable of yielding various different products having pre-selected desirable qualities. A particularly notable feature of our new and improved solvent stripping system is that unique apparatus constituent thereto can be variably controlled to continually produce a totally desolventized product that has been heat-treated to a desired and predetermined degree.

The process and apparatus of this invention may be used not only to strip solvent from soybeans but generally in any similar solvent removal in which the solids to be treated are in particle form. A device of this general type is that shown by Eugene H. Leslie in U.S. Patent No. 2,571,143, where a first device called a desolventizer is coupled at its material output end to feed into a second device referred to as a deodorizer. The efficiency of the Leslie system was notably better than anything else prior to its invention, however, what is presently needed in the industry is a more efficient system capable of producing a final product having a smaller percentage of solvent present therein. The relative efficiency of the Leslie apparatus as compared to the present invention is indicated by the fact that in Leslie's system solvent-impregnated material is fed into the deodorizer vessel near the output end thereof, hence, the solvent-impregnated material has substantially no opportunity for further solvent stripping action before it discharges from the deodorizer unit. Further, Leslie's and other systems of the prior art lack versatility as to residence time of the material, working pressure in the system, and operating temperatures. There is a present need for a system of the general type of the Leslie apparatus which may be operated as a pressurized system without substantial damage to the treated material.

It is therefore a primary object of this invention to provide a solvent removal system that is adjustable as to time, pressure, temperature, and moisture to control the character of the final product.

More particularly, it is an object of this invention to provide in a single system de-solventizing-deodorizing apparatus capable of functioning to treat material over variable lengths of time, and adaptable to operate under conditions of internal pressure which may be selectively varied between sub-atmospheric and super-atmospheric pressure.

It is still another object of the invention to provide an improved process for the removal of residuals solvent from oil-extracted particles.

In accordance with the invention, apparatus is provided for disolventizing and deodorizing solid particulate material impregnated with a volatile solvent. While the invention is particularly addressed in the description hereafter to the treatment of soybean flakes, nevertheless, it is understood that the same system may be employed for the treatment of other materials having similar characteristics whether edible or inedible.

The apparatus in accordance with the invention comprises a vapor desolventizer vessel into which the solvent-wet flakes are fed by a conveyor for the purpose of removing most of the solvent absorbed and entrained in said flakes. In the vapor desolventizer, the flakes or other material being treated are moved through the desolventizer vessel slowly while being exposed to heated vapor of that solvent. The vapors emitted by the material are recirculated, heated, and fed back to the desolventizer vessel so as to impart additional heat to the vessel and the particles therein.

The excess vapor generated by vaporization of the volatile organic solvent within the material being treated is allowed to flow or leak out of the system and pass through a shower of the incoming material to be treated so as to give up most of the superheat of such vapor. It is then allowed to flow through a cyclone scrubber which is a unit where the vapor is scrubbed with the same volatile solvent as that which is being removed from the flakes. The liquids from the cyclone scrubber are drained off and fed back into the system for recirculation as heated vapor.

Since additional liquid solvent is being introduced into the system continuously through the cyclone scrubber and the output vapor is cooled first by contact with the incoming solid particulate material and then further cooled by a spray of solvent material within the cyclone scrubber, and since additional solvent is constantly being carried in the flakes, it would be easy to surmise at first glance that the entire system would rather quickly become congested with excess solvent so that instead of removing solvent from the flakes the system would be increasing the amount of solvent entrained therein. However, the system naturally works as a self-controlled process. The gas in the system is recirculated and reheated continuously until only vaporization takes place. As the volume of vapor increases, then surplus vapor flowing through the scrubber represents the net solvent recovered from the system.

The flakes upon leaving the desolventizer will have lost 90 to 99.5% of the solvent that was entrained in them at the time they entered the vessel. After leaving the desolventizer, the flakes may be treated in a moisturizing unit in order to increase the moisture content of the flakes when desired and particularly when they are to be treated later at high temperatures. From the moisturizing unit the flakes are discharged into a deodorizer vessel wherein the residual-odor-causing solvent is removed from the flakes and the desired degree of heat-treatment is accomplished.

The deodorizing apparatus of the invention makes possible heat-treating over a wide range of pressures, temperatures, and material residence time so as to provide for the desired consistency and quality of the final product. The deodorizing apparatus may be adjusted at any time during the continuation of the process so as to produce different types of output material from the same type of input raw material. The material undergoing deodorization is treated by thoroughly mixing clean fresh steam with the material as it is moved through the deodorizer vessel. Exhausted or solvent-contaminated steam is continuously removed from the system. To assure a solvent-free material, none of the vapor output of the system is injected or recirculated back into the deodorizer unit. So efficient is the process in accordance with the invention that under normal conditions, the product will be completely deodorized a substantial time prior to its leaving the deodorizer vessel. Therefore, cooking or heat-treating time becomes the more critical time, as compared to the time required for effective deodorization. By being able to effectively combine the operations of deodorizing and heat-treating, which were done separately in the prior art, in the instance of treating material in the system that requires a substantial degree of cooking, the deodorization thereof becomes ancillary to the main objective of the sub-system and is automatically and incidentally accomplished sometime prior to the discharge of the material therefrom.

Although steam is injected into the deodorizer vessel to treat the material therin, nevertheless, the pressure inside the vessel is controlled by pressure-sensitive apparatus which provides for the exhaust of vapors from the system at such a rate in proportion to the injected vapors that the sub-system is maintained at a constant internal pressure.

Other advantageous features and objectives will be apparent from the ensuing detailed description when read with reference to the accompanying drawing in which.

Figure 1:
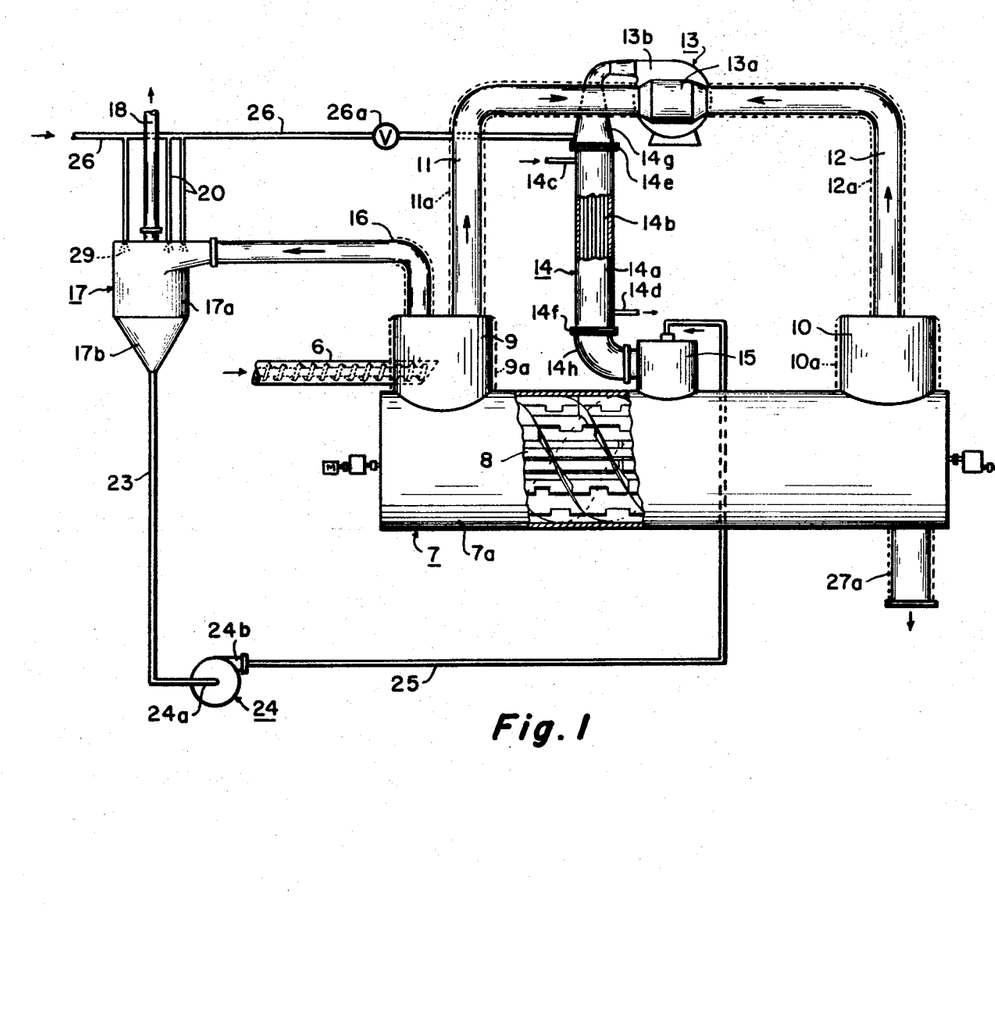
FIGURE 1 is a predominantly diagrammatic layout of the desolventizing apparatus of the system, showing various components thereof in elevation and partially cut away to reveal the internal structure.

Referring to FIGURE 1, extracted flakes to be desolventized are delivered continuously to the system from the output of an extractor (not shown) and through a feed conveyor 6 which may be of a number of types common to the industry such as a screw conveyor. The feed conveyor 6 discharges into the input end of a gross or rough desolventizer 7 which comprises a large tank or envelope 7a being generally cylindrical in shape and elongated along its longitudinal horizontal axis. Integral upward-projecting output domes 9 and 10 are provided near each end of the desolventizer tank 7a, and vapor output conduits or recycling circuit segments 11 and 12 are commonly connected to a recycle vapor blower 13 for causing a steady circulation of vapor therethrough. The output end of discarge tube 13b of the vapor blower 13 is connected to a recycle vapor heater 14 which comprises a canister or casing 14a having a plurality of pipes 14b extending longitudinally therethrough for heating the recycled vapor. A steam-input pipe 14c delivers steam into the casing 14a and a steam exit pipe 14d conducts the condensed steam away from the heater. The spaced apart tubes 14b are suspended between tube sheets 14e and 14f. The flow of vapor which leaves the blower discharge side 13b enters a heater input section 14g and, as the flow meets the tube sheet 14e, it separates into a plurality of parallel flows which pass through tubes 14b. The parallel flows which move therein converge to a single flow in a heater output section 14h. The output section 14h of the recycle vapor heater 14 is connected to the vapor disolventizer tank 7 preferably near the center of the top of the tank by way of a dome 15.

In the following detailed description particular reference will be made to the use of hexane, a solvent commonly used in the extraction of vegetable materials. However, this is done only by way of example, and as will be readily understood by one skilled in the art, variations of conditions would be required for other materials and other solvents than those specifically described herein. The heater 14 functions as a heat exchanger to transfer heat from steam within the casing 14a to the tubes 14b and thence to the parallel vapor flows within said tubes. The heater 14 preferably operates to heat solvent vapor coming from the conduit 12 at a temperature (in the case of hexane) close to a 185° F. and from conduit 11 at a temperature nearer to 165° F. to a temperature in dome 15 in the range of 270° F. to 330° F.

The dome 9 is provided around the end of the feeding conveyor 6 in such manner that the gas coming from the desolventizer 7 into the dome 9 circulates through and among particles of material being carried countercurrent to such gas flow by the conveyor 6 to effectively preheat the particles prior to their actual entrance into the desolventizer vessel.

The dome 9 that encloses the end of the conveyor 6 is connected to a conduit 16 and thence to a desolventizer scrubber 17. The desolventizer scrubber 17 is preferably of cyclone type well known in the art, constructed so that incoming gas vapor from the vapor desolventizer 7 enters into a moist environment created within the casing 17a of the scrubber 17 by spray nozzles 29 which spray additional heated solvent therein. The liquid spray provided by the nozzles 29 serves several purposes: the spray droplets which move down through the scrubber 17 act to scrub fines and entrained material particles that are of dust consistency from the solvent vapor; the spray tends to cool the solvent vapor and thus instigates liquification. An output line or conduit 18 connected at the top center of scrubber 17 carries away the excess or net solvent vapor recovered from the system to a condenser where it is reduced to liquid. This condensation recovery is not part of the present invention so it is sufficient to understand the conduit 18 carries away as vapor the excess of net solvent from the system. At the bottom end of scrubber 17 a drain pipe 23 is provided for draining off the liquid collected within the lower end B of the scrubber 17, and the drain 23 is connetced at its other end to a desolventizer scrubber pump 24 having an input tube 24a and a discharge tube 24b.

The pump 24 receives the liquid through its input tube or side 24a and recirculates the liquid output from the desolventizer scrubber 17 out through its discharge tube 24b to a conduit 25 which directs the liquid flow back to the vapor desolventizer 7 by injecting it into the dome 15 at a point below the recycle vapor heater 14, or it may be returned to the extractor if desired.

A pipe 26 is connected to the blower discharge tube 13a at a point above the recycle vapor 14 for injecting additional solvent into the system for start-up purposes. The pipe 26, through its branches 20, is a means of providing solvent to the aforementioned nozzles 29 mounted within a scrubber 17. A valve 26a is the means to open the pipe 26 leading to the input section 14b of heater 14 during start-up.

Since the system operates to desolventize the material by means of recycling heated solvent vapor which is introduced into tank 7a at a temperature in the range of 270° to 330° F., which is substantially above the boiling point of the solvent, the system therefore acts to desolventize the material by using the vapor of the same solvent as a means of conveying heat to the particles to cause the particles to release entrained and absorbed solvent therefrom.

The pipes or conduits involved in the recycling system comprise double or co-axial pipes such as conduit 12 which has a steam jacket or steam tracing 12a, or conduit 11 which has a jacket or steam tracing 11a so as to provide a space between inner and outer walls in which steam is injected to prevent condensation on the walls of the pipes and thus avoid consequent disruption of a smooth flow pattern therein. In a like manner, other parts of the system can be steam jacketed or steam traced for the same purpose, such as domes 9 and 10 with their respective steam jackets 9a and 10a.

Material to be treated is fed into the desolventizer vessel where it is caused to move therethrough in both a longitudinal and lateral manner by a spiraled lifting cage 8 that causes constant relative reorientation of the particles with respect to each other. This cage type of conveyor 8 is familiar in the art and comprises generally a helical blade that is mounted on longitudinal bars, which in turn are fastened at their ends to journal-supported end plates. Such a cage conveyor is capable of cascading the granular or flaked material within the desolventizer vessel in a generally spiral or corkscrew path that gradually leads the material to the output end of the vessel.

As the particles of material undergoing desolventization pass through the desolventizer 7 they are contacted by solvent vapor superheated to a temperature sufficiently high to assure that the particles of material will absorb that heat which is adequate to evaporate the absorbed liquid solvent. The vapor is thus constantly being removed from the flakes, heated and returned to the flakes to cause them to give up additional solvent vapor. Since additional solvent vapor is constantly being generated into the desolventizer 7, the quantity of gas in the portion of the system comprising the desolventizer 7 and the recycle heater 14 is constantly increasing. There is therefore an excess of vapor which must constantly be carried away from the system and this is accomplished through the vapor output conduit 16 which leads from dome 9 to the desolventizer scrubber 17.

As the flakes reach the output end of the desolventizer 7, they move down through an output opening and through a valve input tube 27a to a rotary valve or vapor lock 27 (shown in FIGURE 2) and then through a valve output tube 27b and into a mixing-conveyor section 28. The mixing section 28 is provided for mixing water with the flakes in order to raise and control the moisture content thereof.

Figures 2, 3:
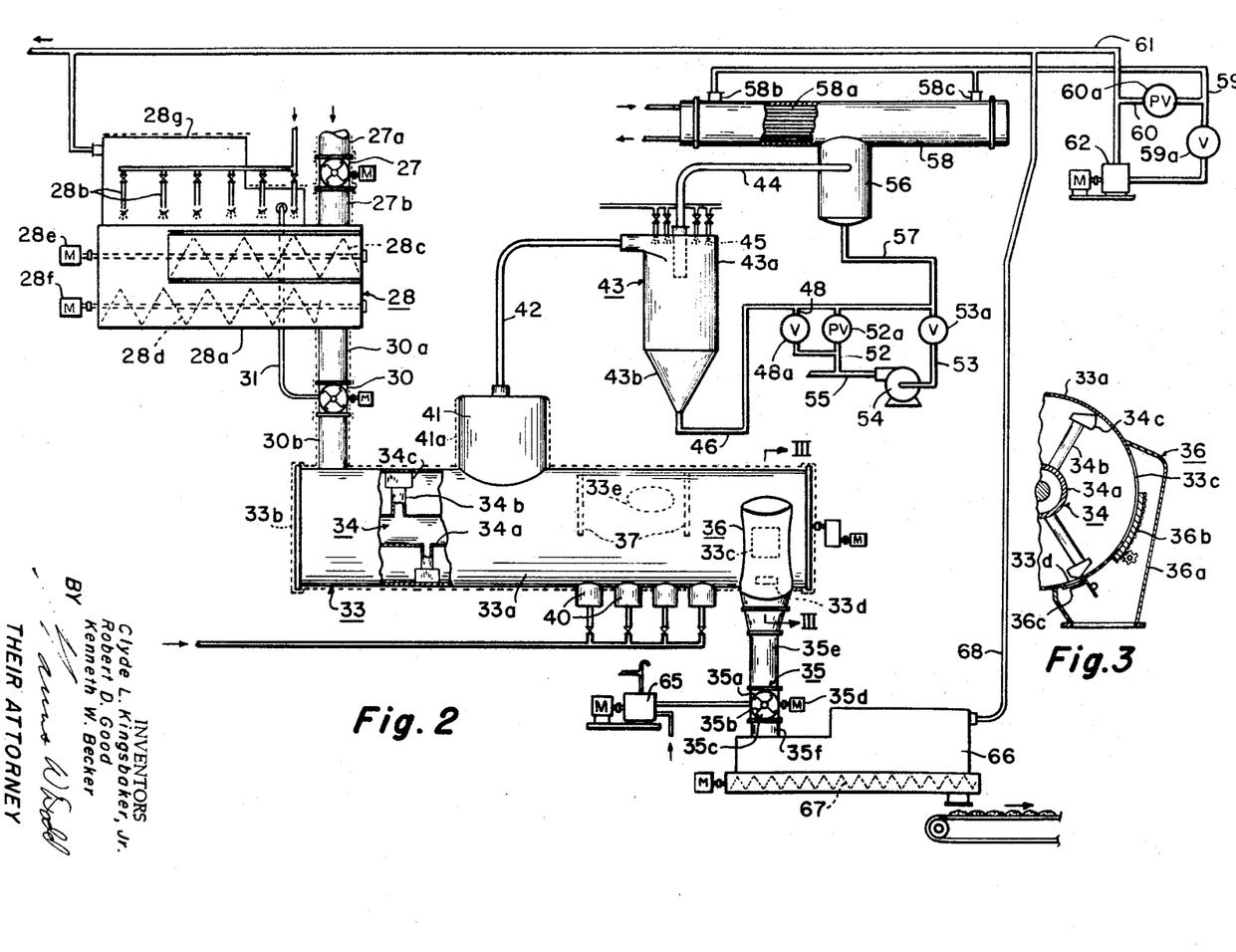
FIGURE 2 is a diagrammatic layout showing the remainder or deodorizing portion of the system.
FIGURE 3 is a fragment of a section taken along line III—III of FIGURE 2, showing a specific structural feature of the deodorizer unit in the system.

The section 28 is a moisture control means and comprises an envelope or container 28a having therein a plurality of spray nozzles 28b for raising the moisture content of the incoming material. Below the nozzles 28b are two conveyors 28c and 28d located in juxtaposition, one above the other, with separate motor means 28e and 28f to provide respective rotation thereof. The type of conveyor utilized in the section 28 is not of great importance except that it must be adaptable to function in a particular manner that will be described herein.

The conveyors 28c and 28d must be capable of moving the flakes in a direction generally transverse to the spray produced by the nozzles 28b, and the upper conveyor 28c is constructed so that it may be rendered ineffective when necessary. This is accomplished in one embodiment of the invention by having the conveyor trough 28c mounted so as to slide along its longitudinal axis. Thus, the upper conveyor trough 28c may be moved away from the stream of incoming flakes so that the flakes are allowed to move downwardly in a vertical direction past the conveyor end and through one side of the moisture-mixing section 28 so as to by-pass the conveyors when it is desired to treat the flakes as they come from the desolventizer 7 without the addition of moisture.

Moisture control is employed primarily in pressure operation of the system where it is found desirable to have flakes with a greater moisture content than required in the vacuum operation. When the system is being operated under pressure and it is desired to add moisture to the flakes after they leave the desolventizer 7, the upper conveyor 28c of the moisture mixing section 28 is moved into its functional position. The flakes being discharged from the rotary exit valve 27 then move downwardly and horizontally through the conveyors 28c and 28d. Thus, for pressure operations where it is desired to add moisture to the flakes, the two conveyors 28c and 28d, working in conjunction move the flakes under the water sprays and delay the flakes a sufficient time to allow them to absorb moisture injected by the spray nozzles 28b in the upper part of the mixing section 28.

A steam trace 28g is provided around the upper portion of the moisture-mixing section 28 to control the temperature of the walls thereof and to discourage condensation thereon and to prevent entrainment of material on the inner sidewall. The steam trace or jacket 28g is extended to surround the rotary valve 27 and the conduits 27a and 27b which are connected thereto and are the means of joining the desolventizing sub-system shown in FIGURE 1 to the deodorizing sub-system shown in FIGURE 2.

The deodorizer in accordance with the invention, a preferred embodiment of which is shown in FIGURE 2, is a deodorizer unit 33 which comprises a large cylindrical tank 33a disposed with its axis horizontal and having therein a device for moving material therethrough transversely and parallel to the axis of the tank 33a. Flakes or other material under treamtent are preferably moved in a loose manner therethrough so that all particle surfaces come in contact with gases therein. The device for moving material through the deodorizer 33 may be of several types such as cage conveyor or screw devices well known in the prior art, however, in accordance with the preferred embodiment of this invention, it is preferred to employ a special agitator-conveyor 34 as described in the application of A. F. Saxon, Ser. No. 524,042, entitled, Desolventizer Construction and Utilization, prepared concurrently herewith and filed Feb. 1, 1966.

Saxon's invention also presents a number of other distinctive features that have been incorporated into the system presented in this specification. Broadly described, Saxon's apparatus is a horizontal treatment vessel having (1) a unique agitator-conveyor device for progressing solids material through the interior of the vessel while continuously re-orienting and showering the material in a direction that is generally lateral in relation to the direction of material advancement therethrough, (2) means of establishing a lower lever of gaseous fluid flow longitudinally through the vessel in order to insure greater contact of fluid with the material mass, such means being in the form of vertical baffle curtains which extend downward from the inner upper wall of the vessel, and (3) a solids material outlet assembly that affords a variable means of controlling material residence time within the vessel.

The special agitator-conveyor 34 broadly comprises a longitudinal center shaft 34a having groups of radially-extending arms 34b positioned along its length in horizontal spaced relation. Each of the arms 34b is provided with an end scoop or bucket 34c, and each scoop 34c is attached in such a manner that it can be repositioned by pivoting it on its base at a point in line with axis of the arm to which it is attached. Thus, the agitator-conveyor 34 has a plurality of scoops 34c set at varying degrees of divergence in relation to the longitudinal shaft 34a. The angle of divergence for any one specific scoop will determine the particular effect on the material within the deodorizer vessel 33 which it contacts. The greater the angle of such divergence of each scoop, the faster such scoop will tend to move material along the length of the vessel 33.

In accordance with the aforementioned specification of Saxon, vertical baffles 37 are provided to extend downwardly into the interior portion of the vessel 33. The baffles 37 have the effect of creating a much more desirable level of steam flow through the vessel. A manhole or opening 33e, or a plurality of such openings having removable cover plates can be provided along the length of the vessel 33 to be used in accordance with Saxon's unique method of baffle installation that allows the agitator-conveyor device to be completely assembled and pre-adjusted prior to its installation within the vessel 33.

The solids outlet assembly 36 broadly comprises a material-receiving housing 36a that is attached to the cylindrical sidewall 33a of vessel 33. The material-receiving housing 36a encloses a primary opening 33c and a lower secondary opening 33d provided through the cylindrical sidewall 33a of the vessel 33, and a movable panel closure or adjustable dam 36b is provided to variably regulate the height of the opening or weir 33c through which material is discharged from the vessel 33 by the revolving-agitator conveyor 34. A secondary opening 33d is provided to permit complete evacuation of material from the vessel at the end of a material "run," and the opening 33d has a door 36c which can be swung away on a hinge provided therefor.

Since the deodorizer vessel 33 is constructed so that it can be selectively operated at sub-atmospheric or super-atmospheric pressure, the means provided for introducing and ejecting solid material to and from the deodorizer sub-system partially comprises rotary feed and discharge locks or valves 27, 30 and 35. As an example, to illustrate the structure and operation of such a device, reference is made in particular to the rotary discharge lock 35 which has an internal cylindrical bore 35a housing therein a revolvable impeller or rotor 35b. The impeller 35b has a plurality of blades or arms extending from its axis so that compartments 35c are formed therebetween. A motor means 35d for actuating the impeller 35b is provided. As the impeller 35b revolves on its axis, the compartment 35c will successively fill with material discharged from the valve input tube 35c, and as each filled compartment moves around and into alignment with the valve output tube 35f, the solid material is discharged toward the output conveyor 67. Although rotary feed locks 27 and 30 are concerned with bringing material into the deodorizer sub-system, their construction and operation as pressure-tight valves is the same as the output rotary feed lock 35.

As a compartment of the lock or valve 30 becomes disposed opposite the output chute or conduit 30a in the moisture-mixing section 28, flakes from the moisture-mixing section 28 fill up that compartment. As the rotor or impeller of the valve 30 rotates, it carries the material around until that compartment is disposed opposite the main deodorizer vessel 33, at which time the material in that compartment discharges out of that compartment into the conduit 30b and thence to the deodorizer vessel 33.

Since during operation under pressure compressed gas from the tank 33a fills successive compartments of the deodorizer feed valve 30 with compressed gas, therefore, as successive compartments thereof are exposed to the conduit 30a from the moisture-mixer 28, the gas in a compartment will tend to flow upward, pushing the material away from the entrance to the compartment. A puff line or pipe 31 is therefore connected to the feed valve 30 so as to relieve the pressure in successive compartments of the feed valve or lock 30 as they return empty from the deodorizer vessel 33. The puff line 31 is in open communication at its other end with the mixing section 28 where any entrained dust passing through the puff line will be deposited.

Steam openings or ports 40 are provided in the bottom of the deodorizer vessel 33 near the output end of the vessel for injecting steam upwardly into the vessel for removal of solvent. Since the boiling point of a liquid mixture containing a hydrocarbon such as hexane and water in it is about 145°, steam of minimum temperature, e.g. 212° under atmospheric pressure, is more than sufficient to remove hexane from the particles. The action of the steam in the deodorizer 33 tends to resemble a stripping action rather than a boiling action, however. Though the temperature of the steam is above the temperature of solvent, nevertheless, the heating caused by the steam is a secondary effect, while the volume striping action of the fresh, clean steam is the primary effect.

Near the top center of the deodorizer 33, a vapor exhaust dome 41 is provided for carrying off exhausted steam and solvent vapor from the deodorizer vessel 33 to a deodorizer scrubber or condenser 43 by way of a conduit 42. The dome 41 is provided with a steam jacket 41a, in the same way that the deodorizer vessel 33 is wrapped in a steam trace 33b.

The deodorizer scrubber 43 is a cyclone gas scrubber wherein the gas enters the scrubber near the top or into a cylindrical portion 43a where it is caused to move in a generally helical path around the inside of the scrubber walls in a circular and downward motion during which some of the gas is liquifying. From the general region of the conical bottom 43b of the scrubber vessel 43, the remaining gas flows up through the center along the vertical axis of the vessel 43 to an output conduit 44 which carries off the exhaust vapors from the scrubber.

Within the top portion 43a of the scrubber 43, provision is made for a plurality of nozzles 45 for spraying water into the scrubber 43 so as to cleanse the gases circulating therethrough and initiate preliminary condensation. The vapors move out the top of the scrubber vessel 43 through conduit 44, and the liquids discharge out the bottom of the scrubber vessel through conduit 46. The exhaust from the bottom of the scrubber vessel 43 comprises mostly water with small quantities of solvent and fine dust particles. The bottom outlet pipe 46 from the deodorizer scrubber 43 passes to one of three alternate channels or pipes 48, 52 and 53, which pipe depending on the type of operation to be employed.

For atmospheric operation, the output of scrubber 43 is fed directly to a water stripper (not shown) through a valve 48a and via pipes 48 and 55. For pressure operation, valves 48a and 53a are closed and the output from the scrubber 43 is fed through a variable pressure valve 52a and thence to the water stripper by way of pipes 52 and 55. For a vacuum operation, the output from the scrubber 43 is fed from pipe 46 through pipe 53 and valve 53a to a positive displacement pump 54 and thence to the water stripper via pipe 55. For the latter operation, valves 48a and 52a are closed.

The vapor from the deodorizer scrubber 43 is fed through a conduit 44 to an entrainment separator tank 56 and then upward to condenser 58. Cooled solvent will fall back through the entrainment separator tank 56 as it becomes a liquid, and passes out of the tank 56 through a condensate pipe 57. From the condenser 58, which is of conventional design with internal cooling tubes or coil 58a, and its accompanying entrainment separator tank 56, there are two outputs or exit openings 58b and 58c leading therefrom and these outlets are joined to a common exhaust pipe 59. The vapor exhaust pipe 59 has a branch line 60 which connects to a vent pipe 61 leading to recovery apparatus (not shown). The condenser exhaust line 59 can be connected directly for pressure operation to the vent line 61 by opening the pressure valve 60a, or alternatively connected by closing the valve 60a and opening valve 59a to a vacuum pump 62 for sub-atmospheric pressure operation.

Below the output assembly 36 of the deodorizer vessel 33 is a conduit section or chute 35e which joins the deodorizer 33 to the discharge lock 35. For vacuum operation, where the pressure inside of the deodorizer vessel 33 is substantially below ambient atmospheric pressure, a lock vacuum pump 65 is desirable to keep bursts of ambient air from being shot into the conduit 35c where they would tend to blow the flakes back up toward the vessel 33 and contaminate the deodorizer with air. The deodorizer discharge lock vacuum pump 65 is thus connected so as to withdraw air from the lock 35 as each moving compartment 35b thereof returns empty prior to registering with conduit 35c.

From the deodorizer discharge lock 35, the treated material discharges into a bin 66 having a conveyor 67 along the bottom thereof. The bin 66 is totally enclosed and has a gas discharge pipe 68 extending therefrom.

The gas discharge pipe 68 leading from the bin 66 above the feed conveyor 67 is necessary during pressure operation of the deodorizer 33 due to bursts of gas being carried through the lock 35 with the material discharged from the deodorizer vessel because of the high working pressure therein.

As the flakes leave the system from conveyor 67, they are free from the odor of the solvent and are in condition, to be prepared as food for animals or human beings or as use as fertilizers, etc.

In the process of this invention, solvent wet flakes are fed into the desolventizer 7 (shown in FIGURE 1) by action of the conveyor 6, and are gently tumbled off the end of the conveyor 6, so as to fall freely into the desolventizer vessel 7. As the flakes are tumbled from the end of the conveyor 6 to the floor of the vapor desolventizer vessel 7, they have already met a stream of gas moving out of the desolventizer vessel 7 and toward the exhaust pipe 16 leading to the scrubber 17. This gas is of a temperature of approximately 160° so that entrained solvent coming with the flakes tends to be expanded and evaporated quickly and the flakes are thoroughly mixed with the gas at a temperature above the boiling point of the solvent so that the flakes are losing solvent as they enter the vessel 7. Thus, effectively, in our system, the exhaust gases from the vapor desolventizer vessel 7 are fed past a portion of the conveyor 6 carrying incoming flakes so as to preheat the flakes and remove some of the surface-entrained solvent before the flakes are dropped into or reach the bottom of the vapor desolventizer vessel 7.

A person skilled in the art would consider it inadvisable to use dirty exhaust gas from such an apparatus as a desolventizer to initiate removal of some of the concentrated solvent from the incoming material, since it would cause contamination of the system. However, here the entire cycle operation in the vapor desolventizer 7 is being carried out with substantially pure recycled solvent vapor. Therefore, the exhaust gas is substantially identical to the vapor which is being recycled in the system. Hence, there is nothing dirty or contaminated about the exhaust gas as distinguished by the vapor being recycled in the system. It is not obvious that a benefit can be derived from having the conveyor 6 feed into the exhaust gas output moving up through dome 9. Actually, it would be more obvious to one skilled in the art to run the desolventizer feed conveyor 6 into the recycle vapor line 14c just below the heater 14 where the particles would be met with a much hotter gas and would be quickly heated to a comparatively high temperature. However, we have found that subjecting the flakes immediately to a temperature in the range of 270° F. produces an undesirable thermal shock. Therefore we have determined that by using the exhaust gas of approximately 160° F. to preheat the solvent wet flakes before reaching the actual internal reaction zone of the vapor desolventizer vessel 7 produces a more desirable result. Since the gases in the desolventizer 7 comprise superheated solvent vapor, it is also an advantage of this arrangement that superheated vapor being exhausted from the system transfers much of its heat to the incoming particles, effecting a conservation of heat in the system. This is a self-controlling system because vapors cooled below the vaporization temperature of the solvent will be carried back into the system.

Inside of the vapor desolventizer vessel 7, the flakes are caused to be lifted and tumbled and mixed with the vapor therein while being gradually moved along the length of the vessel 7 toward the output end thereof. Thus, the vapor desolventizer vessel 7 acts as a device for heating the flakes above the boiling point of the solvent so that the solvent is emitted as a vapor from the flakes. As the vapor rises from the flakes due to its having been vaporized by the hot gases in the vapor desolventizer 7, the vapors are drawn off near each end of the vapor desolventizer vessel 7, fed through a blower 13, thence through a reheater 14, and then fed back into the vapor desolventizer vessel 7 in a heated condition in the range of 270°–330° F. The preheated gases are then fed into the center of the vessel 7, and spread out therethrough to contact the flakes toward both ends thereof. Since the flakes are being constantly heated and become gradually warmer as they move along the length of the vessel 7, the gases rising from the output end of the vessel through dome 10 are at a temperature of approximately 185° F., whereas the gases rising from the input end through dome 9 are at approximately 165° F. Thus, the system is constructed so that it operates to provide a somewhat cooler gas in the region of the input end of the vessel 7 and a somewhat warmer gas at the output end of the vessel 7. This allows for a more gradual heating, consequently lessening the thermal shock on the incoming flakes.

Since the system operates on desolventizer vapors which are continually reheated, a special "start-up" procedure is required. For example, if the vessel 7 has been out of use for a time or is completely new and has never been operated, it will contain an internal atmosphere that is qualitatively the same as the ambient surrounding air. It is desirable that this internal air be quickly removed from the system, preferably prior to the introduction of wet flakes therein, since air and solvent form an explosive mixture which would make the system hazardous to operate. Provision is made for a start-up line or pipe 26 with a valve 26a for initially introducing solvent into the system at a point between the recycle vapor blower's output tube 13b and the vapor heater 14, which solvent then passes with the air through the tubes 14b of vapor heater 14 where it absorbs heat and expands to a vapor. Since the air in the system completely filled the system prior to start-up, then due to the addition of the solvent vapor there is now an excess of gas in the system, this gas being a changing mixture comprising an increasing amount of solvent vapor and a decreasing amount of air. As the total amount of vapor and air in the system increases, a part of the gas in the recycle circuit is forced out the pipe 16 to the scrubber 17. As the cycle continues and more vapor is added, the percentage of air in the recycling circuit continues to decrease. When the percentage of air has decreased to such a level where it is unlikely to be injurious to the incoming solvent-wet material and is no longer in this explosive range, the system is then placed into full operation. Some of the wet material is then fed into the input end of the system by conveyor 6 and allowed to more downwardly into the vapor desolventizer vessel 7. The material is now met by gases which are essentially solvent vapor and therefore will not tend to cause oxidation.

In the operation of the system, there will be some moisture in the incoming solvent wet flakes which will also be evaporated and will add moisture to the system. For start-up purposes in some cases, it will also be desirable to inject additional water into the system so as to produce an atmosphere of substantially the same humidity as that which the flakes have previously been subjected. After the system is in operation, the moisure content of the vapors in the system is substantially constant. Thus, the flakes going through the system tend to give up solvent and water vapor in accordance with the vapor pressure relationships which exist in the system. Since water is constantly extracted from the system along with the solvent vapors, the flakes must of necessity be dryer upon leaving the system than they were at their entrance thereto.

For pressure operation of the deodorizer of sub-system shown in FIGURE 2, it is often desirable to add additional moisture to the flakes before they go into the deodorizer vessel 33. For atmospheric and vacuum operations, the flakes will not normally need additional moisture and therefore it is provided for the upper conveyor 28c to be moved to the left within section 28, leaving an open downward passage for the flakes discharging from the desolventizer vapor seal valve 27.

The moisturizing of the flakes when necessary before their entry into the deodorizer vessel 33 aids in cooking and the pressure of moisture in the flakes has the equivalent effect of injecting a concentrated inert gas into the flakes prior to their entry into the deodorizer 33. Thus, with substantial quantities of water in the flakes, which turns to vapor in the deodorizer 33 and with a relatively smaller quantity of solvent in the flakes, the water vapor coming from the flakes tends to act as a vehicle to carry off the last remaining solvent therefrom.

The deodorizer sub-system in accordance with this invention, a preferred embodiment of which is shown in FIGURE 2, has been conceived for the purpose of providing a highly flexible operation wherein the amount of treatment or cooking of the particles passing therethrough can be widely varied. In addition, for some operations, a wide variety of conditions are desirable. So, provision is made for variations in temperature from approximately 175° under vacuum operation to approximately 250° under pressure operation. Changes in pressure are also provided for. Pressure within the sub-system can be varied from a partial vacuum to pressure substantially in excess of atmospheric pressure, or more specifically, pressure can be varied from approximately two atmospheres to vacuum operation of approximately one-third atmospheric pressure. In addition, variations in time of treatment can be made by varying the effective volume inside of the deodorizer vessel 33. Thus, with a constant rate of flow of material into the vessel 33, by increasing the volume of the material in the vessel by adjusting the height of the dam 36b, the length of time which each individual particle spends in the vessel 33 is increased. Likewise, by decreasing the amount of material in the vessel 33, the length of time which each individual particle spends therein is decreased.

The pressure in the vessel 33 can be controlled under vacuum operation by the vacuum pump 62, and by controlling the rate of flow of steam into the system. Thus, under vacuum operations, the deodorizer vapor vacuum pump 62 will provide a continuous suction from the system. By controlling the input of steam into the system so that the rate of flow thereof and the unavoidable gas inleakage does not exceed the rate of exhaust of the vacuum pump 62, the vacuum will be maintained. The material coming into the deodorizer 33 to be treated under vacuum operations will have moderate moisture and little solvent in it. Thus, there is very little being introduced into the system except the steam for treatment of the material. Therefore, the total determining factors of the pressure in the system, or more particularly the degree of vacuum in the system, will depend on the relationship of the steam coming in and the vacuum pumps pumping out, except for losses or leaks in the system.

Since, under vacuum operation, it is desirable to maintain the flakes at minimum pressure, it is necessary to have some way of getting the material into the deodorizer vessel 33 and out again with as little variance of internal pressure as possible. Therefore, provision is made for a tight deodorizer vapor seal lock 30 at the input end of the deodorizer vessel 33 and a similar valve or tight vapor seal discharge lock 35 at the output end of the system.

Thus, the feed lock 30 moves the material into the system in the nature of continuous increments instead of a continuous flow. Each compartment of a feed lock is successively filled with material and the interstices between the particles of material are filled with air at the ambient pressure in the moisture-mixing apparatus 28 which, when the deodorizer vessel 33 is being operated under a vacuum, is substantially greater than the pressure in the deodorizer vessel. As each successive chamber or compartment of the feed lock 30 moves to a position where it is open to the deodorizer vessel 33, the gas under atmospheric pressure in the successive chamber will suddenly expand in a puff, ejecting the contents into the deodorizer vessel 33 and sending a substantial amount of extra air into the vessel 33. However, it is quite practical to maintain a constant vacuum by moving the material in increments in this manner.

As previously mentioned, the output from the deodorizer scrubber 43 is almost entirely water, with a small amount of solvent and a minute amount of dust. The action of the scrubber 43 is therefore somewhat similar to a partial pressure condenser wherein the steam tends to be condensed to water and wherein temperatures therein are above the vaporization temperature of the solvent and therefore the solvent tends to remain as a gas while the bulk of the water tends to be dropped out as a liquid. The liquid from the deodorizer scrubber 43 is fed out through pipe 46 and through an appropriate channel that is one of the pipes 48, 52 or 53, depending upon whether pressure operation, atmospheric operation or vacuum operation is involved, and thence to a water stripper (not shown).

For atmospheric operation, the liquid flow from the scrubber 43 can be relatively free and direct to the pipe 55 leading out of the system. For pressure operation, a pressure valve 52a is located in the line to prevent loss of pressure to the system. For vacuum operation, the deodorizer scrubber is connected through a positive displacement pump 54 to the water stripper so as to maintain a vacuum in the system.

The vapor output from the deodorizer scrubber 43, which to a large percentage is solvent vapor, passes to a deodorizer condenser 58 where the solvent tends to be condensed, as is the large portion of the remaining water vapor. Condensate coming from the deodorizing condenser 58 is therefore about 70% water and about 30% solvent being variable depending on the type of operation. The condensate from the deodorizer condenser 58 is fed out through appropriate pressure-controlling means such as a pressure valve 52a or positive displacement pump 54, depending upon the type of operation being employed in the system so as to maintain the desired pressure therein.

The vapor coming from the deodorizer condenser 58, which is comprised of air, a relatively small quantity of solvent vapor, and a minute quantity of water vapor, is passed through appropriate control devices such as a vacuum pump 62 in the case of vacuum operation of the system to a vent condenser (not shown) via vent pipe 61.

It should be noted that in accordance with one theory of operation of our invention, the variations in effective temperature of treatment are produced not by making a substantial change in the temperature of the gases in the chamber but instead the change in effective temperature of treatment is produced by varying the flow of heat into the particles. Thus, under pressure operation the steam more readily condenses thereby giving up heat of vaporization to the particles, while under vacuum operation the steam has relatively little tendency to condense and therefore relatively little heat of vaporization is given up to the solid particles.

Essentially, only a preferred embodiment of this new and improved system for solvent stripping has been illustrated and described herein along with a preferred practice or method for the use thereof. Nevertheless, it is expressly recognized that change, adaption and variations are possible without departing from the scope of the invention and the appended claims.

What we claim is:

1. Apparatus for removing solvent from vegetable particulate material comprising an elongated horizontal desolventizing vessel having material input and output openings near opposite ends thereof:
    (a) vapor recycling conduits connected to said vessel to remove vapor from points near the ends of said vessel and to return reheated vapor to a point near the center of said vessel,
    (b) a vapor exhaust conduit connected to said vessel,
    (c) vapor condensing apparatus connected to said vapor exhaust conduit and a liquid recycling conduit connected to said condensing apparatus and to said vessel to return the liquid from said condenser to said vessel,
and apparatus for heat treating said particulate material comprising:
    (d) an elongated horizontal treatment vessel,
    (e) an input conduit connected from said desolventizing vessel to said treatment vessel for supplying material from said desolventizing vessel to said treatment vessel and an output conduit connected to said treatment vessel for removing material therefrom,
    (f) said input conduit comprising therein a material moisturizing unit incorporating a variable time delay material moving apparatus therein,
    (g) said input conduit and said output conduit comprising variably-controllable vapor locks in series therewith, said vapor locks having in connection therewith pressure reducing apparatus for reducing the pressure in portions of said locks when said portions are passing from a high pressure region to a low pressure region,
    (h) means for supplying steam under constant pressure through orifices to said treatment vessel, and
    (i) vapor removing conduit connected to said treatment vessel having variable pressure controlling apparatus in series therewith.

2. Apparatus for heat treating a solid particulate material having a solvent therein comprising: an elongated horizontal vessel, an input conduit connected to said vessel for supplying material to said vessel and an output conduit connected to said vessel for removing material from said vessel, said input conduit comprising therein a material moisturizing unit incorporating a variable time delay material moving apparatus therein, said input conduit and said output conduit comprising variably-controllable vapor locks in series therewith, said vapor locks having in connection therewith pressure reducing apparatus for reducing the pressure in portions of said locks when said portions are passing from a high pressure region to a low pressure region, means for supplying steam under pressure through orifices to said vessel, and a vapor removing conduit connected to said vessel having variable pressure controlling apparatus in series therewith.

3. Apparatus for heat treating a solid particulate material having a solvent therein comprising: an elongated horizontal vessel, an input conduit connected to said vessel for supplying material to said vessel and an output conduit connected to said vessel for removing material from said vessel, material moving and reorganizing apparatus inside said vessel for moving material through said vessel said input conduit and said output conduit comprising variably-controllable vapor locks in series therewith, said vapor locks having in connection therewith pressure reducing apparatus for reducing the pressure in portions of said locks when said portions are passing from a high pressure region to a low pressure region, means for supplying steam under constant pressure through orifices to said vessel and a vapor removing conduit connected to said vessel having variable pressure controlling apparatus in series therewith, said material moving apparatus comprising a plurality of paddles rotating about an axis parallel to the main direction of flow of said material and set at an angle to said axis, said paddles mounted to be adjustable at predetermined discrete angles.

4. Apparatus for desolventizing and heat treating a solid vegetable particulate material impregnated with a volatile solvent comprising apparatus for contacting said material with reheated and recirculated vapor of said solvent during one phase and apparatus for deodorizing and heat treating said material with steam while continuously showering said material in another single unified phase of operation, said apparatus being adapted to operate alternatively under sub-atmospheric, atmospheric, and superatmospheric pressures, said deodorizing apparatus being provided with material moving apparatus which comprises a plurality of paddles rotating about an axis parallel to the main direction of flow of said material and set at an angle to said axis, said paddles mounted to be adjustable at predetermined discrete angles.

5. Apparatus for heat treating and removing solvent from vegetable particulate material comprising:
    (a) an elongated horizontal desolventizing vessel having material input and output openings near opposite ends thereof;
    (b) vapor recycling conduits connected to said vessel to remove vapor from points near the ends of said vessel and to return reheated vapor to a point near the center of said vessel;
    (c) an exhaust conduit connected to said vessel so as to exhaust surplus vapor from said vessel through said material input opening;
    (d) vapor condensing apparatus connected to said vapor output conduit and a liquid recycling conduit connected to said condensing apparatus and to said vessel to return the liquid from said condenser to said vessel,
and apparatus for heat treating said particulate material comprising:
    (e) an elongated vessel,
    (f) an input conduit connected from said desolventizing vessel to said treatment vessel for supplying material to said treatment vessel and an output conduit connected to said treatment vessel for removing material from said treatment vessel,
    (g) said input conduit comprising therein a material moisturizing unit incorporating a variable time delay material moving apparatus therein,
    (h) said input conduit and said output conduit comprising variably-controllable vapor locks in series therewith, said vapor locks having in connection therewith pressure reducing apparatus for reducing the pressure in portions of said locks when said portions are passing from a high pressure region to a low pressure region, (i) means for supplying steam under constant pressure through orifices to said treatment vessel, and (j) vapor removing conduit connected to said treatment vessel having variable pressure controlling apparatus in series therewith, (k) means for varying the temperature of said treatment vessel independently of the pressure in said vessel.

6. Apparatus as described in claim 9 characterized in that there is provided moving means in said vessel for moving material through said vessel while showering such material in said vessel, said moving means being adjustable to vary the velocity of flow of material therethrough while maintaining the rate of showering of said material constant.

7. In a desolventizing system for solid organic particulate material a deodorizer vessel comprising: a chamber for said material, means for supplying an inert gas continuously to and exhaust control means connected to said chamber to vary the pressure in said chamber for alternate super-atmospheric, atmospheric and vacuum operation.

8. Apparatus as described in claim 7 characterized in that the chamber is provided with means therein for showering said solid material.

9. Apparatus as described in claim 8 characterized in that the chamber is provided with steam deflecting baffles therein to deflect steam passing therethrough into the path of said showering material.

10. Apparatus as described in claim 9 characterized in that steam input ports are located near the bottom of said chamber.

11. Apparatus as described in claim 10 characterized in that means are provided for controlling the volumes of volatile material emanating from said chamber independently of the volume rate of material entering said treating means so as to control the pressure in said treating means.

12. Apparatus as described in claim 11 characterized in that said chamber is provided with gas tight feed and discharge locks.

13. Apparatus as described in claim 7 characterized in that said chamber is provided with a variable height output weir opening and material leveling means for moving solid particulate material therethrough in a fluid-like manner.

14. Apparatus for removing an organic solvent from a particulate organic solid material comprising apparatus for removing the majority of said solvent from said material, a moistener adapted to receive material from said apparatus and a deodorizer adapted to receive said material from said moistener, said deodorizer comprising means for contacting said material with steam and being adapted for sub-atmospheric, atmospheric and super-atmospheric operation alternatively and having material moving means in said deodorizer for showering said material and for moving said material through said deodorizer at variable rates independent of the rate of showering.

15. Apparatus as described in claim 14 characterized in that means are provided to control the time of treatment of said solid material comprising material leveling means and a variable height output weir.

16. Process for removing residual volatile substance from a particulate solid material and heat treating said solid material comprising the steps of determining the maximum temperature that the material should be subjected to during the processing of the material, contacting said material with vapors of said volatile substance, and placing said material in a pressure-tight chamber, placing an inert gas in said chamber maintaining the temperature of the material in said chamber below the said maximum temperature, and varying the time and pressure of processing to remove the solvent.

References Cited

UNITED STATES PATENTS

| | | | |
|---|---|---|---|
| 962,118 | 6/1910 | Bradley | 34—15 |
| 2,691,830 | 10/1954 | Karnofsky | 34—77 X |
| 2,746,168 | 5/1956 | Rickabugh | 34—51 |
| 2,571,143 | 10/1951 | Leslie | 34—182 |

FREDERICK L. MATTESON, JR., *Primary Examiner.*

E. G. FAVORS, *Assistant Examiner.*

UNITED STATES PATENT OFFICE
CERTIFICATE OF CORRECTION

Patent No. 3,392,455

July 16, 1968

Clyde L. Kingsbaker, Jr., et al.

It is certified that error appears in the above identified patent and that said Letters Patent are hereby corrected as shown below:

Column 2, line 45, "disolventizing" should read -- desolventizing --. Column 3, line 59, "therin" should read -- therein --. Column 5, line 15, "of", first occurrence, should read -- or --; same line 15, "discarge" should read -- discharge --; lines 30 and 31, "disolventizer" should read -- desolventizer --. Column 6, line 55, "treamtent" should read -- treatment --; line 75, "lever" should read -- level --. Column 8, line 30, "striping" should read -- stripping --. Column 13, line 48, "incorporatting" should read -- incorporating --. Column 14, line 36, "superatmospheric" should read -- super-atmospheric --. Column 15, line 21, before "and" insert -- said chamber --.

Signed and sealed this 1st day of September 1970.

(SEAL)
Attest:

Edward M. Fletcher, Jr.
Attesting Officer

WILLIAM E. SCHUYLER, JR.
Commissioner of Patents